(12) United States Patent  
Blankenship

(10) Patent No.: US 7,650,700 B1  
(45) Date of Patent: Jan. 26, 2010

(54) TILE INSTALLATION SPACER AND METHOD OF USE

(76) Inventor: Robert L. Blankenship, 5148 E. Karen Dr., Scottsdale, AZ (US) 85254

( * ) Notice: Subject to any disclaimer, the term of this patent is extended or adjusted under 35 U.S.C. 154(b) by 0 days.

(21) Appl. No.: 12/192,649

(22) Filed: Aug. 15, 2008

Related U.S. Application Data

(60) Provisional application No. 61/062,930, filed on Jan. 30, 2008.

(51) Int. Cl.
*G01B 1/00* (2006.01)
*E04G 21/18* (2006.01)

(52) U.S. Cl. .............. 33/527; 33/645; 33/DIG. 20; 52/747.1; D10/64

(58) Field of Classification Search ............ 33/526, 33/527, 1 F, 1 G, 562, 613, 645, 518, 567, 33/DIG. 20; 52/747.11, 747.12, 747.1, 384, 52/389, 390, 392, 396.1, 677; D10/64; D25/199
See application file for complete search history.

(56) References Cited

U.S. PATENT DOCUMENTS

| | | | | |
|---|---|---|---|---|
| 1,139,119 A * | 5/1915 | Heidenreich | ................ | 446/256 |
| 4,454,699 A * | 6/1984 | Strobl | ................ | 52/585.1 |
| 4,793,068 A * | 12/1988 | Golkar | ................ | 33/526 |
| 5,288,534 A * | 2/1994 | Tavshanjian | ................ | 428/64.1 |
| 5,623,799 A * | 4/1997 | Kowalski et al. | ................ | 52/392 |
| 6,874,242 B2 * | 4/2005 | Shilo et al. | ................ | 33/526 |
| 7,065,930 B2 * | 6/2006 | Schulze | ................ | 52/365 |
| D542,161 S * | 5/2007 | Skillings | ................ | D10/64 |
| 7,475,488 B2 * | 1/2009 | Symington | ................ | 33/526 |
| 7,536,802 B1 * | 5/2009 | Tavy et al. | ................ | 33/527 |
| 2004/0250435 A1 * | 12/2004 | Fiore | ................ | 33/527 |

* cited by examiner

*Primary Examiner*—Amy Cohen Johnson
(74) *Attorney, Agent, or Firm*—Parsons & Goltry; Michael W. Goltry; Robert A. Parsons

(57) ABSTRACT

A tile installation spacer includes a circular disk having opposed, parallel surfaces, and opposed cylindrical first and second spacers extend away from the respective surfaces of the disk. The disk, the first cylindrical spacer, and the second cylinder each have a diameter. The diameter of the disk is greater than the diameter of the first cylindrical spacer and the diameter of the second cylindrical spacer, and the diameter of the first cylindrical spacer is greater than the diameter of the second cylindrical spacer.

3 Claims, 3 Drawing Sheets

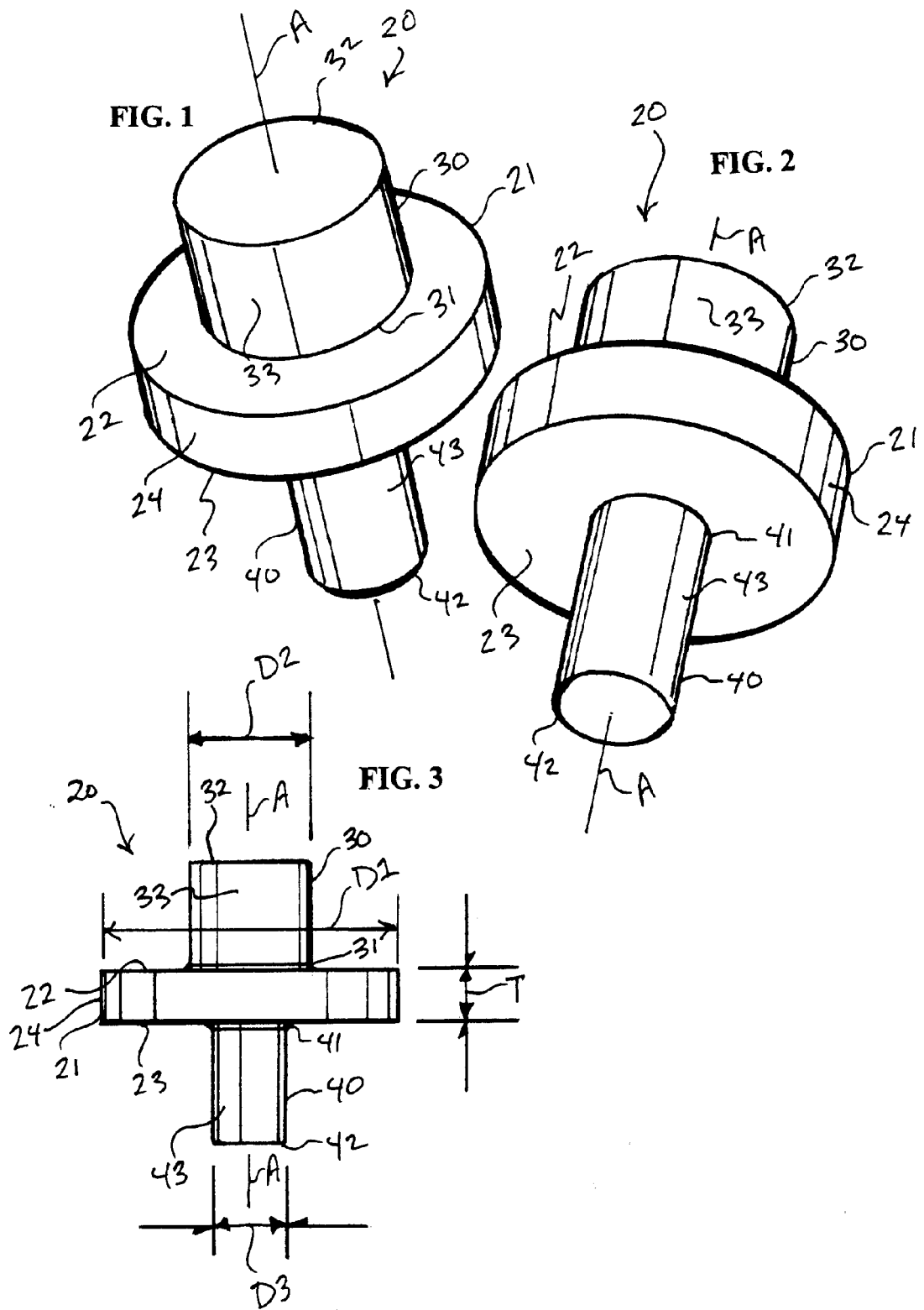

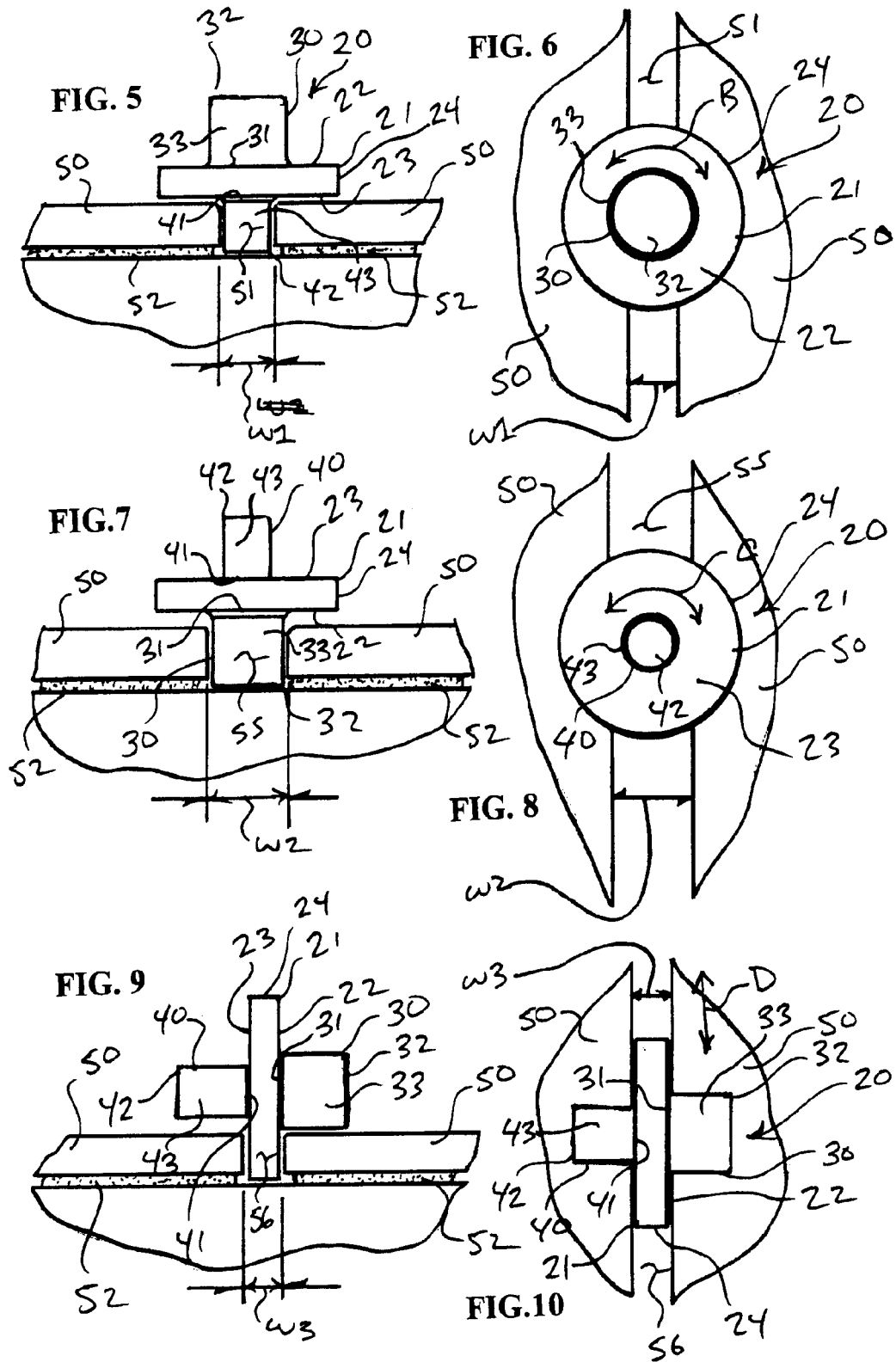

# TILE INSTALLATION SPACER AND METHOD OF USE

FIELD OF THE INVENTION

The present invention relates to tile installation and, more particularly, to tile installation spacers used in the tile installation process and to tile installation methods.

BACKGROUND OF THE INVENTION

In tiling a surface individual tiles are set onto adhesive applied to the surface of a floor or substrate. The tiles are arranged in a predetermined pattern on the surface and are separated by intertile grout lines or simply grout lines. After the adhesive is sufficiently cured bonding the tiles in place, grout is applied into the grout lines. In the process of setting the individual tiles, spacers are often applied in the grout lines to ensure a uniform spacing between the individual tiles. Typical tile spacers are made of semi-rigid plastic having depths ranging from, for instance, ⅛ to 3/16 of an inch, with spacing widths of between 1/16 of an inch and ⅜ of an inch. For brick, cement block and larger tile forms, larger sizes of spacers, with considerably more depth, are used.

The spacers of conventional tile spacers have rectangular or square cross sections. When such a conventional spacer is positioned in a grout line separating adjacent tiles, opposing flat surfaces of the spacer reside in juxtaposition to the opposing confronting edges of the adjacent tiles. If the spacer is twisted or moved during installation or adjustment, it is common for the spacer to act on the confronting edges of the adjacent tiles pushing the opposing tiles apart if the spacer is accidentally twisted or jarred thereby misaligning the adjacent tiles. Also, because conventional spacers have square or rectangular cross sections, such tile spacers are difficult if not impossible to adjust while installed in the grout line without jarring the adjacent tiles out of alignment. Moreover, after a conventional tile spacer is installed in a grout line, it is virtually impossible to make minor adjustments to the adjacent tiles prior to the adhesive curing without causing the tile spacer to shift or twist, which, again, is due principally to the square or rectangular cross section of the spacer applied to the grout line.

Given these and other deficiencies in the art of tile spacers, the need for continuing improvement in the art is evident.

SUMMARY OF THE INVENTION

It is an object of the invention to provide a tile installation spacer that is easy to make, easy to install into an intertile grout line between adjacent tiles, that can be moved or otherwise adjusted relative to adjacent tiles while installed in the grout line without risk of pushing the adjacent tiles out of alignment if the tile installation spacer is twisted or rotated relative to the adjacent tiles, which is low in cost, and which offers different modes of use to accommodate grout lines of varying width.

According to the principle of the invention, a tile installation spacer consists of a disk including opposed parallel first and second surfaces and a center, a circular, circumferential edge encircling the center of the disk, a diameter extending through the center of the disk meeting at the circular, circumferential edge at each end, and a uniform thickness from the first surface to the second surface. A first cylindrical spacer has a proximal end affixed to the first surface of the disk and extends away from the first surface of the disk to a distal end, a center, a circular, circumferential outer surface encircling the center of the first cylindrical spacer, and a uniform diameter from the proximal end to the distal end of the first cylindrical spacer extending through the center of the first cylindrical spacer meeting at the circular, circumferential outer surface of the first cylindrical spacer. A second cylindrical spacer has a proximal end affixed to the second surface of the disk and extends away from the second surface of the disk to a distal end, a center, a circular, circumferential outer surface encircling the center of the second cylindrical spacer, and a uniform diameter from the proximal end to the distal end of the second cylindrical spacer extending through the center of the second cylindrical spacer meeting at the circular, circumferential outer surface of the second cylindrical spacer. The diameter of the disk is greater than the diameter of the first cylindrical spacer and the diameter of the second cylindrical spacer, and the diameter of the first cylindrical spacer is greater than the diameter of the second cylindrical spacer. The first cylindrical spacer has a depth extending outwardly from the first surface of the disk which is a significant fraction of a depth of a tile to be spaced thereby and the first diameter of the first cylindrical spacer is equal to a width of an intertile grout line which is intended to separate tiles to be spaced thereby, and the circular, and the circular, circumferential outer surface of the first cylindrical spacer allows the first cylindrical spacer to rotate in the intertile grout line separating tiles to be spaced thereby. The second cylindrical spacer has a depth extending outwardly from the second surface of the disk which is a significant fraction of a depth of a tile to be spaced thereby and the second diameter of the second cylindrical spacer is equal to a width of an intertile grout line which is intended to separate tiles to be spaced thereby, and the circular, circumferential outer surface of the second cylindrical spacer allows the second cylindrical spacer to rotate in the intertile grout line separating tiles to be spaced thereby. The tile installation spacer defines an axis extending through the centers of the disk and the first and second cylindrical spacers from the distal ends of the first and second spacers about which the disk and the first and second cylindrical spacers are symmetrical. The thickness of the disk is different from the diameter of the first cylindrical spacer and the second cylindrical spacer. The disk has a depth extending circumferentially outward from the circular, cylindrical outer surface of the first cylindrical spacer which is a significant fraction of a depth of a tile to be spaced thereby and the thickness of the disk is equal to a width of an intertile grout line which is intended to separate tiles to be spaced thereby, and the circular, circumferential edge of the disk allows the disk to rotate in the intertile grout line separating tiles to be spaced thereby. The disk, the first cylindrical spacer, and the second cylindrical spacer are formed of a single piece of semi-rigid material.

BRIEF DESCRIPTION OF THE DRAWINGS

Referring to the drawings:

FIG. 1 is a top perspective view of a tile installation spacer constructed and arranged in accordance with the principle of the invention;

FIG. 2 is a bottom perspective view of the tile installation spacer of FIG. 1;

FIG. 3 is a side elevational view of the tile installation spacer of FIG. 1;

FIG. 5 is a side elevational view of the tile installation spacer of FIG. 1 shown as it would appear installed in a first orientation in the intertile grout line between opposed tiles;

FIG. 6 is a top plan view of the installation of FIG. 5;

FIG. 7 is a side elevational view of the tile installation spacer of FIG. 1 shown as it would appear installed in a second orientation in the intertile grout line between opposed tiles;

FIG. 8 is a top plan view of the installation of FIG. 7;

FIG. 9 is a side elevational view of the tile installation spacer of FIG. 1 shown as it would appear installed in a third orientation in the intertile grout line between opposed tiles; and FIG. 10 is a top plan view of the installation of FIG. 9.

DETAILED DESCRIPTION OF PREFERRED EMBODIMENTS

Figure 4:
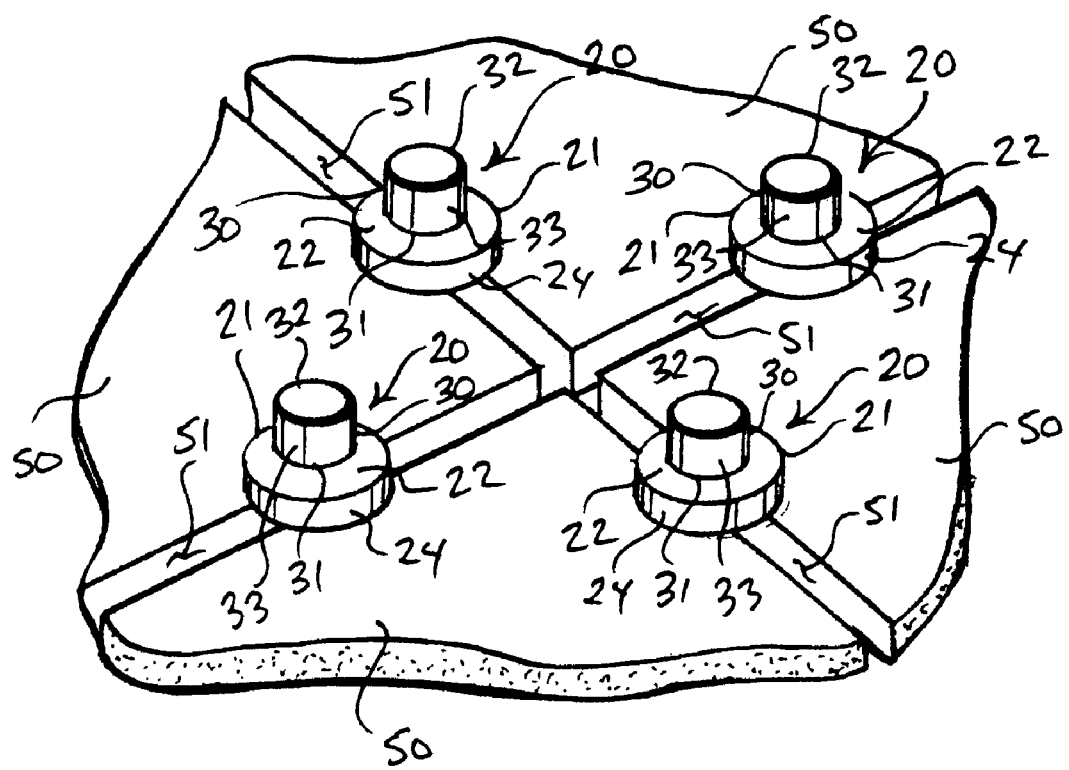
FIG. 4 is a perspective view of a plurality tile installation spacers in accordance with the principle of the invention in use setting tiles.

Turning now to the drawings, in which like reference characters indicate corresponding elements throughout the several views, attention is directed in relevant part to FIGS. 1-3 in which there is seen a tile installation spacer 20 constructed and arranged in accordance with the principle of the invention including a disk 21 having opposed parallel surfaces 22 and 23 and a center, and a circular, circumferential edge 24 encircling the center of disk 21. Referenced in FIG. 3, disk 21 has a diameter D1 extending through the center of disk 21 meeting at circular, circumferential edge 24 at each end, and a uniform thickness T from surface 22 to surface 23. Disk 21 is broad and circular, as illustrated. Tile installation spacer 20 is formed with opposed cylindrical spacers 30 and 40. Cylindrical spacer 30 has a proximal end 31 affixed to surface 22 of disk 21 and extends away from surface 22 of disk 21 to an opposed distal end 32. Cylindrical spacer 30 has a center, a circular, circumferential outer surface 33 encircling the center of cylindrical spacer 30 extending from proximal end 32 to distal end 33, and, as referenced in FIG. 3, a uniform diameter D2 from proximal end 31 to distal end 32 of cylindrical spacer 30 extending through the center of cylindrical spacer 30 meeting at outer surface 33 of cylindrical spacer 30. Cylindrical spacer 40 has a proximal end 41 affixed to surface 23 of disk 21 and extends away from surface 23 of disk 21 to an opposed distal end 42. Cylindrical spacer 40 has a center, a circular, circumferential outer surface 43 encircling the center of cylindrical spacer 40 extending from proximal end 42 to distal end 43, and, as referenced in FIG. 3, a uniform diameter D3 from proximal end 41 to distal end 42 of cylindrical spacer 40 extending through the center of cylindrical spacer 40 meeting at outer surface 43 of cylindrical spacer 40.

Tile installation spacer 20 defines an axis A extending through and defining the centers of disk 21, cylindrical spacer 30, and cylindrical spacer 40, about which disk 21 and cylindrical spacers 30 and 40 are symmetrical. Diameter D1 of disk 21 is greater than diameter D2 of cylindrical spacer 30. Diameter D1 of disk 21 is also greater than diameter D3 of cylindrical spacer 40. Diameter D2 of cylindrical spacer 30 is greater than diameter D3 of cylindrical spacer 40. Moreover, thickness T of disk 21 is less than diameter D3 of cylindrical spacer 40. Tile installation spacer 20 is, according to a preferred embodiment, are made of a unitary piece of semi-rigid material, such as plastic, elastomeric material, or the like.

Tile installation spacers 20 constructed and arranged in accordance with the principle of the invention are used in the installation of tiles to space the tiles apart to form uniform intertile grout lines between the tiles 50. Tile installation spacer 20 is useful in three ways, the first of which is illustrated in FIGS. 5 and 6, the second of which is illustrated in FIGS. 7 and 8, and the third of which is illustrated in FIGS. 9 and 10.

In a first mode of use of tile installation spacer 20 as illustrated in FIG. 5, opposed tiles 50 are set onto adhesive 52 applied to a supporting substrate 53 leaving an intertile grout line 51 therebetween. In this operation, width W1 of intertile grout line 51 is equal to diameter D3 (referenced only in FIG. 3) of cylindrical spacer 40. As such, tile installation spacer 20 is taken up, such as by hand, and maneuvered to insert cylindrical spacer 40 into intertile grout line 51 between tiles 50 bringing surface 23 into resting engagement against the upper or outer faces of opposed tiles 50 as illustrated in FIG. 5. Diameter D1 of disk 21 is substantially greater than width W1 of intertile grout line 51 to ensure surface 23 of disk 21 rests on the upper or outer faces of tiles 50 in the installation of cylindrical spacer 40 in intertile grout line 51, maintaining cylindrical spacer 40 in intertile grout line 51 and preventing tile installation spacer 20 from tipping over during this installation process. Cylindrical spacer 40 has a depth extending outwardly from surface 23 of disk 21 from proximal end 41 at surface 23 of disk 21 to distal end 42 which is a significant fraction of the depth of each tile 50 to be spaced thereby, and diameter D3 of cylindrical spacer 40 is equal to width W1 of intertile grout line 51 which is intended to separate tiles 50 to be spaced thereby. As adhesive 52 cures, cylindrical spacer 40 positioned in intertile grout line 51 maintains the spacing between tiles 50 formed by intertile grout line 51.

Circular, circumferential outer surface 43 of cylindrical spacer 40 allows cylindrical spacer 40, and thus the whole of tile installation spacer 20, to rotate in clockwise and counterclockwise directions about axis A in intertile grout line 51 separating tiles 50 to be spaced thereby as indicated by the double arrowed line B in FIG. 6, such as in an adjustment of tile installation spacer 20 along grout line 51, or perhaps as the opposed edges of tiles 50 forming intertile grout line 51 act on circular, circumferential outer surface 43 of cylindrical spacer 40 as tiles 50 are shifted back and forth in the setting of tiles 50, in accordance with the principle of the invention. Because diameter D3 of cylindrical spacer 40 is uniform from proximal end 41 of cylindrical spacer 40 to distal end 42 of cylindrical spacer 40, the width of cylindrical spacer 40 as defined by diameter D3 does not change relative to grout line 51 and relative to the confronting edges of opposing tiles 50 as cylindrical spacer 40 rotates in grout line 51 and the width W1 of intertile grout line 51, therefore, does not change when tiles 50 shift and act on circular, circumferential outer surface 43 of cylindrical spacer 40 causing tile installation spacer 20 to rotate relative to tiles 50, or otherwise if cylindrical spacer 40 is rotated in grout line 51 through the rotation of tile installation spacer 20 or the adjustment of tile installation spacer 20 along grout line 51. Accordingly, the cylindrical shape of cylindrical spacer 40, as herein described, prevents cylindrical spacer 40 from acting on the adjacent tiles 50 in response to rotation of cylindrical spacer 40 in grout line 51. After adhesive 52 is sufficiently cured, tile installation spacer 20 may be removed and grout applied into intertile grout line 51. As a matter of illustration, FIG. 4 is a perspective view of a plurality of tile installation spacers 20 used in this first mode of operation and shown installed in intertile grout lines 51 between tiles 50 to maintain the spacing between tiles 50 provided by intertile grout lines 51.

In a second mode of use of tile installation spacer 20 as illustrated in FIG. 7, opposed tiles 50 are set onto adhesive 52 applied to a supporting substrate 53 leaving an intertile grout line 55 therebetween. In this operation, width W2 of intertile grout line 55 is equal to diameter D2 (referenced only in FIG. 3) of cylindrical spacer 30. Width W2 of intertile grout line 55 in FIG. 7 is greater than width W1 of intertile grout line 51 in FIGS. 5 and 6. As such, tile installation spacer 20 is taken up, such as by hand, and maneuvered to insert cylindrical spacer 30 into intertile grout line 55 between tiles 50 bringing surface 22 into resting engagement against the upper or outer faces of opposed tiles 50 as illustrated in FIG. 7, maintaining cylindrical spacer 30 in intertile grout line 55 and preventing tile installation spacer 20 from tipping over during this installation process. Diameter D1 of disk 21 is substantially greater than width W2 of intertile grout line 55 to ensure surface 22 of disk 21 rests on the upper or outer faces of tiles 50 in the installation of cylindrical spacer 30 in intertile grout line 55. Cylindrical spacer 30 has a depth extending outwardly from surface 22 of disk 21 from proximal end 31 at surface 22 of disk 21 to distal end 32 which is a significant fraction of the depth of each tile 50 to be spaced thereby, and diameter D2 of cylindrical spacer 30 is equal to width W2 of intertile grout line 55 which is intended to separate tiles 50 to be spaced thereby. As adhesive 52 cures, cylindrical spacer 30 positioned in intertile grout line 55 maintains the spacing between tiles 50 formed by intertile grout line 55.

Circular, circumferential outer surface 33 of cylindrical spacer 30 allows cylindrical spacer 30, and thus the whole of tile installation spacer 20, to rotate in clockwise and counterclockwise directions about axis A in intertile grout line 55 separating tiles 50 to be spaced thereby as indicated by the double arrowed line C in FIG. 8, such as in an adjustment of tile installation spacer 20 along grout line 55, or perhaps as the opposed edges of tiles 50 forming intertile grout line 55 act on circular, circumferential outer surface 33 of cylindrical spacer 30 as tiles 50 are shifted back and forth in the setting of tiles 50, in accordance with the principle of the invention. Because diameter D2 of cylindrical spacer 30 is uniform from proximal end 31 of cylindrical spacer 30 to distal end 32 of cylindrical spacer 30, the width of cylindrical spacer 30 as defined by diameter D2 does not change relative to grout line 55 and relative to the confronting edges of opposing tiles 50 as cylindrical spacer 30 rotates in grout line 51 and the width W2 of intertile grout line 55, therefore, does not change when tiles 50 shift and act on circular, circumferential outer surface 33 of cylindrical spacer 30 causing tile installation spacer 20 to rotate relative to tiles 50, or otherwise if cylindrical spacer 30 is rotated in grout line 55 through the rotation of tile installation spacer 20 or the adjustment of tile installation spacer 20 along grout line 55. Accordingly, the cylindrical shape of cylindrical spacer 30, as herein described, prevents cylindrical spacer 30 from acting on the adjacent tiles 50 in response to rotation of cylindrical spacer 30 in grout line 55. After adhesive 52 is sufficiently cured, tile installation spacer 20 may be removed and grout applied into intertile grout line 55. A plurality of tile installation spacers 20 may be used in the second mode of operation like in the illustration of FIG. 4.

As previously mentioned, thickness T of disk 21 illustrated in FIG. 3 is less than diameter D3 of cylindrical spacer 40, and may be used in the setting of tiles. In a third mode of use of tile installation spacer 20 as illustrated in FIG. 9, opposed tiles 50 are set onto adhesive 52 applied to a supporting substrate 53 leaving an intertile grout line 56 therebetween. In this operation, width W3 of intertile grout line 56 is equal to thickness T (referenced only in FIG. 3) disk 21. Width W3 of intertile grout line 55 in FIG. 9 is lesser than width W1 of intertile grout line 51 in FIGS. 5 and 6. As such, tile installation spacer 20 is taken up, such as by hand, and maneuvered to insert circular, circumferential outer edge 24 of disk 21 into intertile grout line 56 between tiles 50 bringing circular, cylindrical outer surface 33 of cylindrical spacer 30 into resting engagement against the upper or outer face of one of the opposed tiles 50 as illustrated in FIG. 9. Disk 21 has a depth extending circumferentially outward from circular, cylindrical outer surface 33 of cylindrical spacer 30 to circular, cylindrical outer edge 24 which is a significant fraction of the depth of each tile 50 to be spaced thereby, and thickness T of disk 21 is equal to width W3 of intertile grout line 56 which is intended to separate tiles 50 to be spaced thereby. As adhesive 52 cures, disk 21 positioned in intertile grout line 56 maintains the spacing between tiles 50 formed by intertile grout line 56. Circular, circumferential outer edge 24 of disk 21 in intertile grout line 56 and circular, circumferential outer surface 33 of cylindrical spacer 30 resting on one of the opposed tiles 50 allows disk 21, and this the whole of tile installation spacer 20, to rotate in clockwise and counterclockwise directions in and along intertile grout line 56 separating tiles 50 to be spaced thereby to move tile installation spacer 20 in reciprocal directions along and relative to intertile grout line 56 as indicated by the double arrowed line D in FIG. 10 to allow for adjusting of tile installation spacer 20 as needed. Because thickness T of disk 21 is uniform from circular, circumferential outer surface 33 of cylindrical spacer 30 to circular, cylindrical outer edge 24 of disk 21, width W3 of intertile grout line 56 does not change as tile installation spacer 20 is rotated or otherwise rolled along and relative to intertile grout line 56. After adhesive 52 is sufficiently cured, tile installation spacer 20 may be removed and grout applied into intertile grout line 55. A plurality of tile installation spacers 20 may be used in the third mode of operation like in the illustration of FIG. 4.

The dimensions of the thickness T of disk 21, diameter D2 of cylindrical spacer 30, and diameter D3 of cylindrical spacer 40 are different relative to each other as herein disclosed thereby providing at least three modes of operation of tile installation spacer 20, namely, to allow tile installation spacer 20 to be used in at least three different tiling operations involving three different grout line widths including one corresponding to thickness T of disk 21, one corresponding to diameter D2 of cylindrical spacer 30, and one corresponding to diameter D3 of cylindrical spacer 40. The dimension of thickness T of disk 21, diameter D2 of cylindrical spacer 30, and diameter D3 of cylindrical spacer 40 are each, therefore, different from one another, and each can each be provided to define a particular dimension and depth to meet any required grout line width and depth.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A tile installation spacer, comprising:
   a disk including opposed parallel first and second surfaces and a center, a circular, circumferential edge encircling the center of the disk, a diameter extending through the center of the disk meeting at the circular, circumferential edge at each end, and a uniform thickness from the first surface to the second surface;
   a first cylindrical spacer having a proximal end affixed to the first surface of the disk extending away from the first surface of the disk to a distal end, a center, a circular, circumferential outer surface encircling the center of the first cylindrical spacer, and a uniform diameter from the proximal end to the distal end of the first cylindrical spacer extending through the center of the first cylindrical spacer meeting at the circular, circumferential outer surface of the first cylindrical spacer;

a second cylindrical spacer having a proximal end affixed to the second surface of the disk extending away from the second surface of the disk to a distal end, a center, a circular, circumferential outer surface encircling the center of the second cylindrical spacer, and a uniform diameter from the proximal end to the distal end of the second cylindrical spacer extending through the center of the second cylindrical spacer meeting at the circular, circumferential outer surface of the second cylindrical spacer;

the disk and the first and second cylindrical spacers form a tile installation spacer;

the diameter of the disk greater than the diameter of the first cylindrical spacer and the diameter of the second cylindrical spacer;

the diameter of the first cylindrical spacer greater than the diameter of the second cylindrical spacer;

the tile installation spacer defines an axis extending through the respective centers of the disk and the first and second cylindrical spacers about which the disk and the first and second cylindrical spacers are symmetrical;

the first cylindrical spacer having a depth extending outwardly from the first surface of the disk which is a significant fraction of a depth of a tile to be spaced thereby and the first diameter of the first cylindrical spacer equal to a width of an intertile grout line which is intended to separate tiles to be spaced thereby, and the circular, circumferential outer surface of the first cylindrical spacer allowing the first cylindrical spacer to rotate in the intertile grout line separating tiles to be spaced thereby; and the second cylindrical spacer having a depth extending outwardly from the second surface of the disk which is a significant fraction of a depth of a tile to be spaced thereby and the second diameter of the second cylindrical spacer equal to a width of an intertile grout line which is intended to separate tiles to be spaced thereby, and the circular, circumferential outer surface of the second cylindrical spacer allowing the second cylindrical spacer to rotate in the intertile grout line separating tiles to be spaced thereby.

2. The tile installation spacer according to claim 1, wherein the thickness of the disk is different from the diameter of the first cylindrical spacer and the second cylindrical spacer, the disk having a depth extending circumferentially outward from the circular, cylindrical outer surface of the first cylindrical spacer which is a significant fraction of a depth of a tile to be spaced thereby and the thickness of the disk equal to a width of an intertile grout line which is intended to separate tiles to be spaced thereby, and the circular, circumferential edge of the disk allowing the disk to rotate in the intertile grout line separating tiles to be spaced thereby.

3. The tile installation spacer according to claim 2, wherein the disk, the first cylindrical spacer, and the second cylindrical spacer are formed of a single piece of semi-rigid material.

* * * * *